United States Patent [19]

Speckhart

[11] Patent Number: 4,492,279
[45] Date of Patent: Jan. 8, 1985

[54] INFANT HEALTH MONITORING SYSTEM

[76] Inventor: Frank H. Speckhart, 534 Dellwood Dr., Knoxville, Tenn. 37919

[21] Appl. No.: 428,389

[22] Filed: Sep. 29, 1982

[51] Int. Cl.³ .................. G01G 23/18; G01G 3/14; G01G 3/08; A61B 19/00
[52] U.S. Cl. .................................. 177/45; 177/211; 177/229; 128/1 B; 128/723
[58] Field of Search ............... 177/45, 46, 211, 229; 128/1 B, 716, 721–723

[56] References Cited

U.S. PATENT DOCUMENTS

| | | | |
|---|---|---|---|
| 3,658,052 | 4/1972 | Alter | 128/721 |
| 4,169,462 | 10/1979 | Strubé | 128/721 |
| 4,364,442 | 12/1982 | Flickinger | 177/211 X |

*Primary Examiner*—George H. Miller, Jr.

[57] ABSTRACT

A scale for weighing infants using four cantilever beams supporting a platform with a strain gauge on each beam. The strain gauges are connected in a Wheatstone bridge circuit to provide a voltage signal which is independent of the location of the infant on the platform.

4 Claims, 5 Drawing Figures

INFANT HEALTH MONITORING SYSTEM

Premature infants are extremely delicate so they should stay in their warm draft-free incubators as much as possible since they can be harmed seriously by even brief exposure to a different environment. However, these infants should also be weighed frequently since even small losses of weight can be signs of failing health while steady increases usually indicate progress. In the past, doctors have been forced to balance the need for frequent weighings against the stress and injury which could result from the shock of each journey from the incubator to the scale. The health monitoring system of the present invention removes this conflict as it provides a scale which is compact enough to remain inside standard incubators so that the baby's weight can be checked as frequently as desired without disturbing his environment. Weights can be determined at remote locations and it is not even necessary to reposition the infant for weighing since accurate determinations are obtained so long as the baby remains on the platform of the scale. This system can also detect respiration and trigger an alarm should the baby stop breathing. Further, the baby may be X-rayed inside an incubator equipped with this scale since the measuring apparatus may be arranged around the periphery of the incubator.

DESCRIPTION OF THE PREFERRED EMBODIMENT

Figure 1:
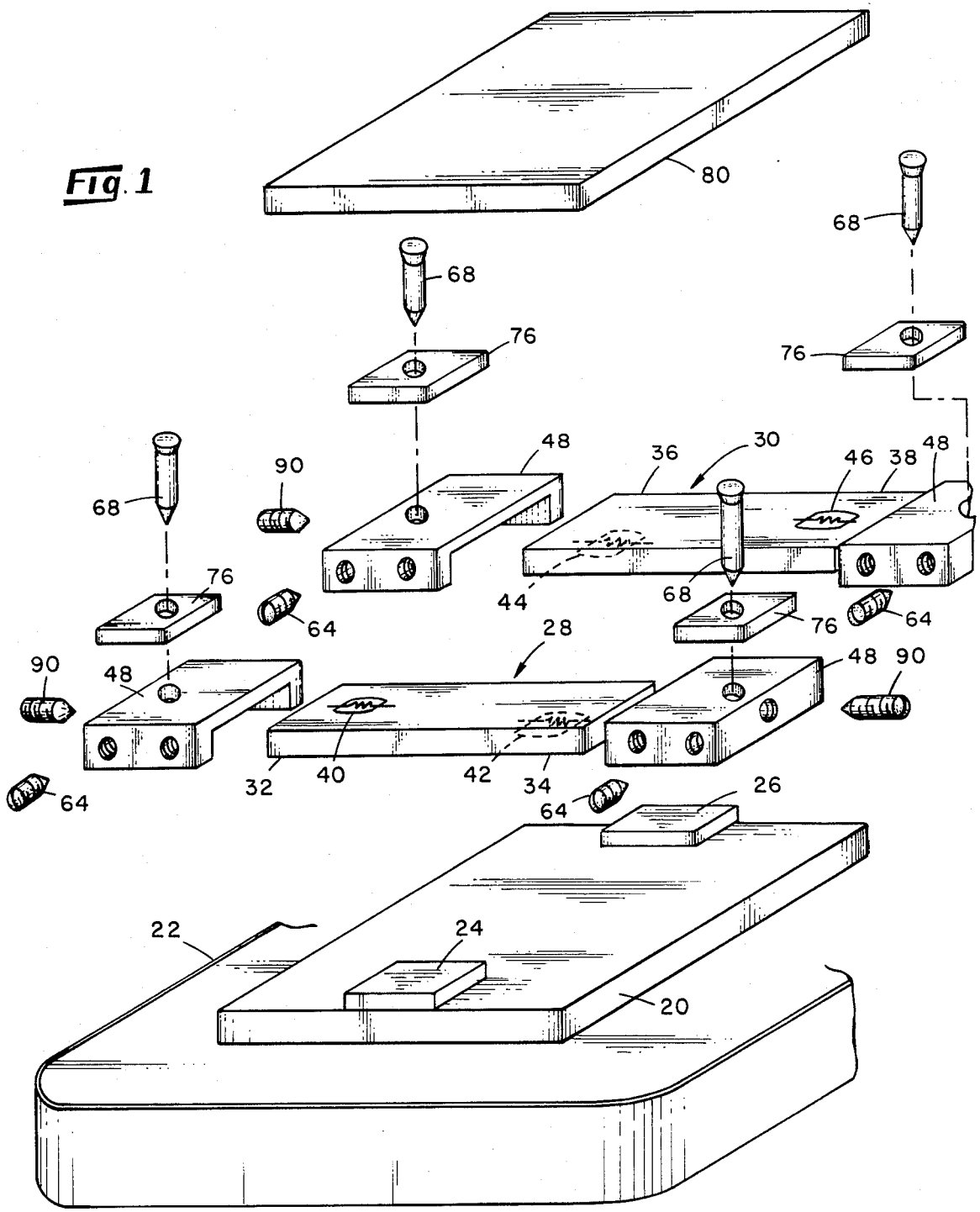
FIG. 1 is an exploded perspective illustrating the mechanical portion of the infant health monitoring system of the present invention.

In FIG. 1, base 20 fits inside and rests upon the bottom of incubator chamber 22. Support blocks 24 and 26 are fixed to base 20 and rigidly support the central portions of beams 28 and 30 which are rigidly fixed to support blocks 24 and 26.

Cantilever portions 32 and 34 of beam 28 and cantilever portions 36 and 38 of beam 30 project beyond respective support blocks 24 and 26 and carry strain guages 40, 42, 44 and 46 thereon. Strain gauges 40 and 46 are mounted on the upper surfaces of cantilevers 32 and 38 respectively while strain gauges 42 and 44 are mounted on the lower surfaces of cantilevers 34 and 36 respectively, thus when a downward directed load is applied to each cantilever, diagonally opposed strain gauges 40 and 46 will be in tension while diagonally opposed strain gauges 42 and 44 will be in compression. Thus the strain gauges alternate from the top of one cantilever to the bottom of the next and back in sequence around the scale.

Figure 2:
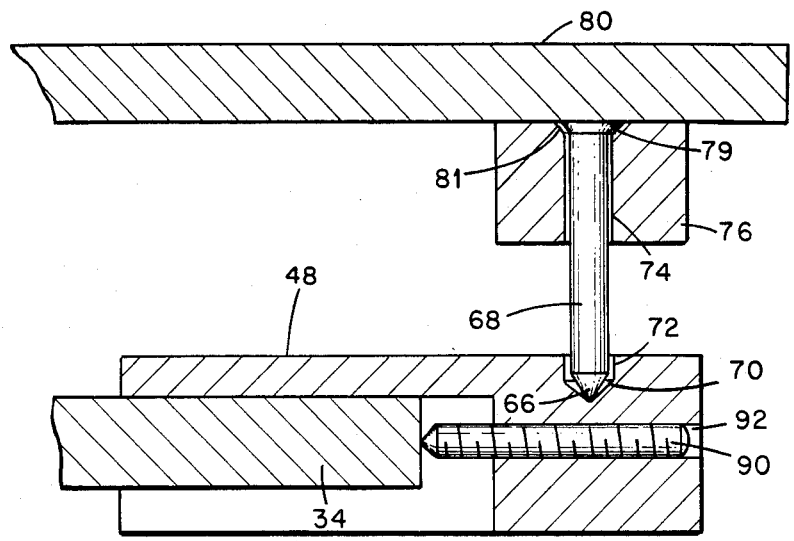
FIG. 2 illustrates a platform support mechanism.

Sliding blocks 48 are adjustably mounted upon cantilever portions 32, 34, 36 and 38. Each sliding block 48 may be fixed in position on its respective cantilever 32, 34, 36 or 38 by tightening set screws 64 carried on each sliding block 48. As illustrated in FIG. 2, each sliding block 48 has formed in its upper surface, conical support surface 66 which engages support pin 68 having conical tip 70 which allows each support pin to pivot to accommodate adjustment of sliding block 48. The central angle of conical support surface 66 is at least 5 degrees and preferably at least 15 degrees greater than central angle of conical tip 70. Conveniently, pin restraining means 72 are also formed in the upper surface of each sliding block 48 to maintain conical tip 70 of support pin 68 in engagement with conical support surface 66 while allowing pivoting. Further, lateral retaining means 74 are formed in retainer blocks 76 to retain support pin in supported engagement with conical support surface 66 and in supporting engagement with platform 80 throughout the range of adjustment of sliding blocks on the respective cantilever 32, 34, 36 or 38. Platform 80 rests upon slightly rounded, enlarged upper ends 79 of support pins 68.

Support pins 68 are retained in pivotable engagement with the lower surface of platform 80 by vertical retaining means 81 formed in retainer blocks 76 which prevent slightly rounded enlarged upper ends 79 of support pins 68 from passing through lateral restraining means 74.

Figure 3:
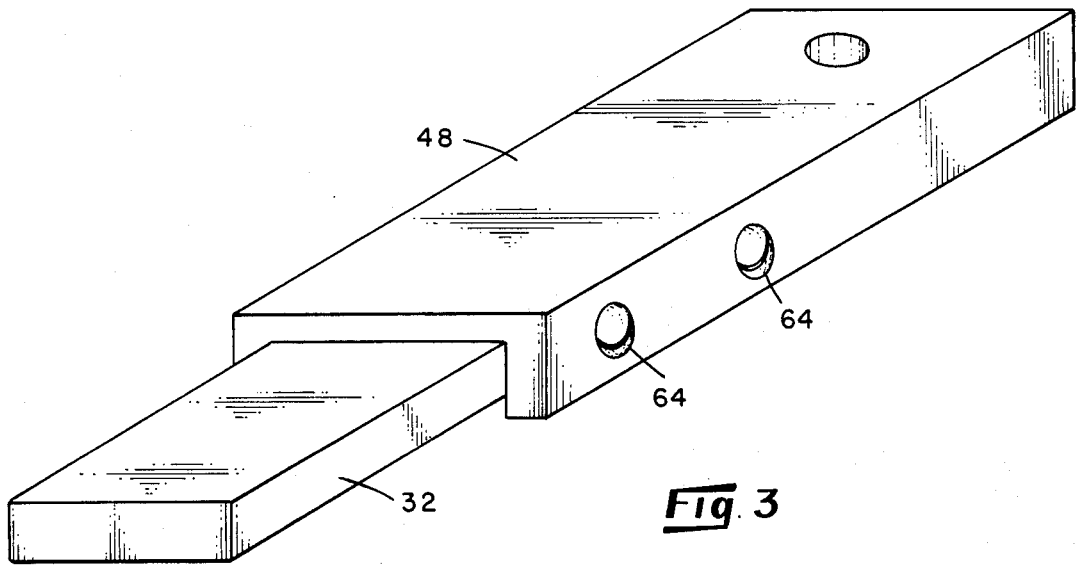
FIG. 3 illustates an adjusting mechanism which is useful in calibrating the scale of the present invention.

Strain gauges 40, 42, 44 and 46 are preferably fixed to cantilevers 32, 34, 35 and 38 respectively at equal distances from support blocks 24 and 26. So that the output from the scale of the present invention will be substantially independent of the location of the baby on platform 80, after strain gauges 40, 42, 44 and 46 are fixed to cantilevers 32, 34, 36 and 38, each sliding block 48 is adjusted to obtain substantially equal displacement from the center of each respective conical support surface 66 to its associated strain gauge 40, 42, 44 and 46 so that equivalent (in absolute value) strains are obtained in each gauge for equivalent loads borne by each sliding block 48. Conveniently, the location of each sliding block 48 may be adjusted by turning adjusting screw 90 carried in tapped hole 92 in each sliding block 48. Adjusting screws 90 bear against the end of each cantilever 32, 34, 36 or 38 so that positive, precise adjustment of each sliding block 48 may be obtained. As mentioned, once adjusted, each sliding block 48 is locked into position with set screws 64 as shown in FIG. 3.

The outer periphery of platform 80 conforms to the interior of incubator 22 leaving only a small gap to prevent binding thereby ensuring that the entire weight of the infant is carried by platform 80.

Figure 4:
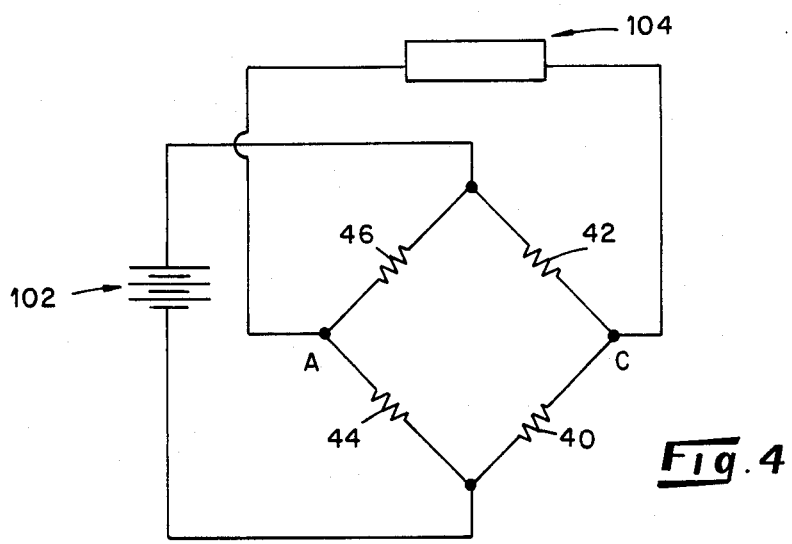
FIG. 4 is a schematic of the electrical curcuit of the scale of the present invention.
Figure 5:
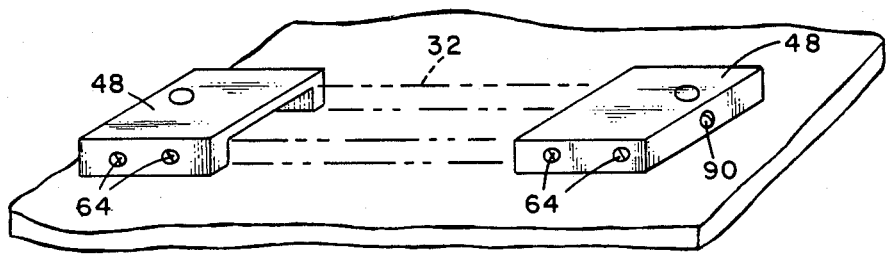
FIG. 5 illustrates the cantilever platform support mechanism as assembled.

As shown in FIG. 4, strain gauges 40, 42, 44 and 46 are arranged to form a Wheatstone bridge. The positive pole of voltage source 102 is connected to strain gauges 42 and 46 while the negative pole is connected to strain gauges 44 and 40. Strain gauge 46 is connected to strain gauge 44 at node A while strain gauge 42 is connected to strain gauge 40 at node C. In operation, the current flow from the positive pole of voltage source 102 is divided between the portion of the current flowing through strain gauges 46 then 44 and the portion flowing through strain gauges 42 then 40 to the negative pole of voltage source 102. High impedance voltage detecting means 104, connected between nodes A and C provides an output signal which is substantially proportional to the total load on platform 80.

When connected to appropriate voltage detecting and readout means, the output from the scale of the present invention may be readily converted to read directly in units of weight and may be zeroed to account for the weight of items other than the baby which may be resting on platform 80. The sensitivity of the system of the present invention is such that the infant's respiration can be readily detected by voltage detecting readout means 104 as low level rhythmic fluctuations in the signal. Circuits which are capable of detecting the absence of low level fluctuations are well known and can be easily arranged to trigger an alarm if respiration should cease for any significant period of time.

As my invention, I claim:

1. A scale for weighing infants comprising: a base; a first pair of cantilevers mounted on the base adjacent one end of the base; a second pair of cantilevers mounted on the base adjacent the other end of the base; a first strain gauge mounted on the upper surface of one of said first pair of cantilevers; a second strain gauge mounted on the lower surface of the other of said first pair of cantilevers; a third strain gauge mounted on the lower surface of one of said second pair of cantilevers; a fourth strain gauge mounted on the upper surface of the other of said second pair of cantilevers, said first and fourth strain gauges being mounted on diagonally opposite cantilevers, and said second and third strain gauges being mounted on diagonally opposite cantilevers; said strain gauges being connected in Wheatstone bridge circuit comprising a voltage source and four nodes, one lead of each of said third and fourth strain gauges being connected to the first of said nodes, one lead of each of said first and second strain gauges being connected to the second of said nodes, the other leads of said first and fourth strain gauges being connected to the third of said nodes, the other leads of said second and third strain gauges being connected to the fourth of said nodes; means for providing a signal corresponding to the voltage difference between said first and second nodes; and a platform supported by said cantilevers, four slideable members, one of said slideable members being adjustably mounted on each of said cantilevers, each slideable member having a support surface formed in its upper face adapted to receive a conically terminated support pin; and four support pins, each support pin being in pivotable engagement with one of said support surfaces whereby said platform is supported by said support pins.

2. The scale for weighing infants of claim 1, further comprising lateral restraining means mounted on each of said slideable members, for maintaining said pivotable support pins in engagement with said support surfaces and a plurality of vertical restraining means mounted on the lower surface of said platform for retaining said pivotable support in supporting engagement with said platform while allowing said pin to pivot to accommodate adjustment of said slideable members.

3. The scale of claim 2 further comprising means for detecting the substantial absence of fluctuations in the voltage between said first node and said second node and triggering an alarm in response thereto.

4. The scale of claim 1 further comprising means for detecting the substantial absence of fluctuations in the voltage between said first node and said second node and triggering an alarm in response thereto.

* * * * *